United States Patent [19]

Fritsch et al.

[11] 4,359,439
[45] Nov. 16, 1982

[54] METHOD AND APPARATUS FOR PRODUCING AN EXTRUDED PLASTIC BAR WITH PLURAL SURFACE CHARACTERISTICS

[75] Inventors: Günter Fritsch, Ennepetal; Heinz Vollmer; Walter Schmitz, both of Wuppertal, all of Fed. Rep. of Germany

[73] Assignee: Gebr. Happich GmbH, Fed. Rep. of Germany

[21] Appl. No.: 271,245

[22] Filed: Jun. 8, 1981

[30] Foreign Application Priority Data

Aug. 28, 1980 [DE] Fed. Rep. of Germany ....... 3032347

[51] Int. Cl.³ .............................................. B29F 3/08
[52] U.S. Cl. .................................... 264/135; 264/174; 264/177 R; 264/237; 264/327; 425/113; 425/325; 425/378 R; 425/467
[58] Field of Search ............... 264/176 R, 174, 519, 264/177 R, 209.7, 520, 135, 521, 136, 237, 348, 327; 425/113, 378 R, 467, 325, 379

[56] References Cited

U.S. PATENT DOCUMENTS

| 2,904,844 | 9/1959 | Smithies | 264/284 |
|---|---|---|---|
| 3,241,182 | 3/1966 | Kessler | 427/327 |
| 3,508,554 | 4/1970 | Sheridan | 264/209.7 |
| 3,525,125 | 8/1970 | Berger et al. | 425/467 |
| 3,780,152 | 12/1973 | Friesner | 264/177 R |
| 3,811,989 | 5/1974 | Hearn | 264/177 R |
| 4,021,172 | 5/1977 | Prinz | 425/325 |
| 4,229,407 | 10/1980 | Craig | 264/519 |

FOREIGN PATENT DOCUMENTS

| 1238196 | 4/1967 | Fed. Rep. of Germany . |
|---|---|---|
| 1285721 | 12/1968 | Fed. Rep. of Germany . |
| 2016581 | 10/1970 | Fed. Rep. of Germany . |
| 2040713 | 4/1972 | Fed. Rep. of Germany . |
| 2344658 | 11/1977 | Fed. Rep. of Germany . |
| 634465 | 3/1950 | United Kingdom . |
| 985292 | 3/1965 | United Kingdom . |
| 1117239 | 6/1968 | United Kingdom . |
| 1228672 | 4/1971 | United Kingdom . |

Primary Examiner—Jeffery R. Thurlow
Attorney, Agent, or Firm—Ostrolenk, Faber, Gerb & Soffen

[57] ABSTRACT

The invention concerns the production of an extruded plastic sectional bar, or the like profiled element, having one longitudinally extending section which has a duller surface finish and another longitudinally extending section which has a less dull surface. To accomplish this, the extrusion tool, at the outlet end, has first and second temperature control devices so that as the bar is being extruded, the first section of the bar is exposed to one temperature while the second section of the bar is exposed to a different temperature, for producing the different surface finishes.

7 Claims, 2 Drawing Figures

METHOD AND APPARATUS FOR PRODUCING AN EXTRUDED PLASTIC BAR WITH PLURAL SURFACE CHARACTERISTICS

BACKGROUND OF THE INVENTION

This invention relates to a method and apparatus for producing an extruded plastic bar, or the like, having at least two longitudinally extending sections around the bar with different surface characteristics.

Plastic sectional bars are used, e.g. in motor vehicles, to a considerable extent as protective or as trim strips. They generally have a uniformly colored surface. Depending on the composition of the material and the temperature of the extruder used in fabricating them, the sectional bars can have a bright to high-mirror finish surface, or a dull or matte surface. There are also sectional bars with surfaces having colored longitudinally extending strips.

Consumers demand sectional bars with surfaces having at least one continuous dull zone extending in the longitudinal direction. The dull zone is particularly desired in sectional bars with colored longitudinally extending strips, where the surface of the colored longitudinally extending strips is to remain dull relative to the remaining surface.

An extruded trim strip of transparent or translucent plastic is available which has both a colored longitudinal strip and a dull surface in this region. This trim strip is produced by co-extrusion using two plastic materials which are adapted exactly to the desired appearance of the surface. Although a sectional bar with different degrees of brightness can be obtained by co-extrusion, this requires a relatively elaborate extrusion tool and an additional extruder, so that the manufacturing costs are quite high.

German Published Application (Offenlegungsschrift) No. 20 40 713 discloses a plastic molded body that is dulled by coating the molded object with a dull varnish. It seems difficult to apply this to a plastic sectional bar where only a limited width strip dull zone is to be produced. This would at least require an additional operation, which is susceptible to trouble, and there could be a problem regarding the adhesion of the dull varnish to the surface of the sectional bar.

Furthermore, this German application shows the possibility of producing a dull surface in plastic molded objects by dulling the surface of the molding tool used in the manufacture, for example, by etching the molding tool surface. This may bring the desired result in the manufacture of molded plastic objects which are molded by reshaping, but if this were applied to an extrusion tool, it would cause the sectional bars thus produced to have a cracked surface.

German Allowed Application (Auslegeschrift) No. 12 38 196 discloses applying colored strips to the surface of pipes by pressing on colored strips directly after the pipes emerge from the extruder, under slight pressure. This requires storage and separate manufacture of colored strips and involves the use of an apparatus for applying the strips. For these reasons, this considerably increases the cost of the end product.

SUMMARY OF THE INVENTION

It is the object of the present invention to provide a method of the above-mentioned type and an apparatus for carrying out this method which permits simple, problem-free and low-cost production of at least one dull zone on the surface of a plastic sectional bar, which zone is continuous along the longitudinal direction of the bar.

The invention comprises extruding the bar or sectional bar through an extrusion nozzle, wherein at the outlet end of the nozzle, two different temperature zones are provided around the nozzle so that the surface is exposed to two different temperatures during the extrusion, each causing a respective different surface texture to develop on the sectional bar.

Processing defects can appear in the manufacture of extruded plastic sections, either in the form of blisters on the surface or dark colorations, which indicate a working temperature that is too high, or in the form of rough surfaces, which indicate a working temperature that is too low. For this reason, the profile is extruded according to the invention at the optimum working temperature, and the surface of the sectional bar is directly influenced at the outlet end section of the extrusion tool, so that the desired result is obtained in an optimum manner, as practical tests have shown.

With the invention, extruded plastic sectional bars, regardless of whether the bars are glass-clear or colored, or whether they have an embedded trim strip or not, can be produced with one or more precisely defined dull strips. This merely requires controlled heat zone separation around the extrusion tool, according to the invention. The invention permits the surface of a sectional bar that has been found of relatively dull plastic material to be bright to brilliant through use of a controlled heat supply. Conversely, it is possible to obtain dull strips on the surfaces of sectional bars which were produced from bright plastic material by corresponding cooling.

The apparatus according to the invention requires a minimum of modification and supplementation of a conventional extrusion tool, so that the costs of the tool and of the extruding are minimal, and as a practical matter, they do not increase the price of the end product. The invention solves the problem in question with a minimum of expenditure.

Other objects and features of the invention will be apparent from the following description, with reference to the accompanying drawings.

DESCRIPTION OF A PREFERRED EMBODIMENT

Figure 1:
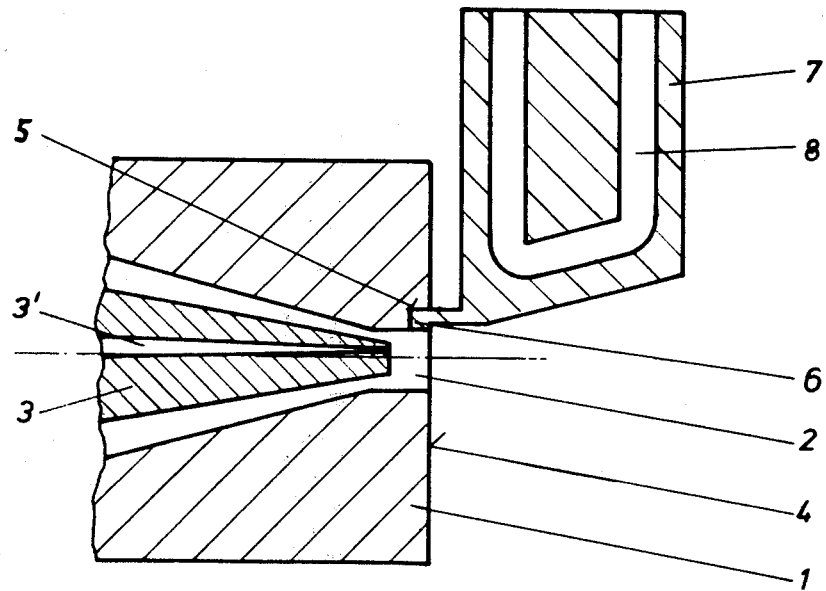
FIG. 1 shows a section through a region of the extrusion apparatus.

FIG. 1 shows the cross-section of an extrusion tool 1 of the invention for use with a conventional extruder (not shown). The tool includes a guide 3 arranged in a tool aperture 2 for producing a trim foil 10. At the outlet end 4 of the extrusion tool 1, there is a recess 5 which widens the edge zone of the tool aperture 2. The free end of a tool insert 6 engages in the recess 5, so that the end of the tool aperture wall is planar.

Tool insert 6 is integral with an attachment 7 and is made of the same material of high thermal conductivity, e.g. copper etc. Channels 8 provided in attachment 7 serve for the passage of a medium which is used to control the temperature of the tool insert 6. The temperature of the medium passing through channels 8 can be kept constant as desired with a control circuit (not shown).

Figure 2:
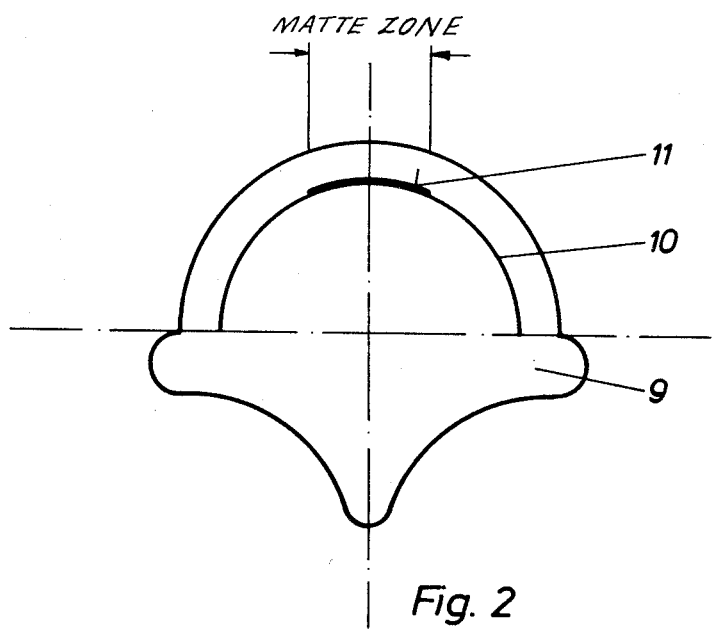
FIG. 2 shows a cross-section of a plastic sectional bar produced by means of the apparatus according to FIG. 1.

FIG. 2 shows one possible cross-section through a sectional bar 9 produced according to the method of the invention. It consists of glass-clear PVC (polyvinylchloride), for example, and has a trim foil 10 of metal or plastic embedded therein. Trim foil 10 is provided with a colored varnish coat 11. Apart from the dull zone, the surface of sectional bar 9 has a high-mirror finish.

In the manufacture of sectional bar 9, trim foil 10 is provided with a varnish coat 11 before it enters the extruder (not shown), and the trim foil is guided together with the varnish coat through the extruder, the shaping hereof being effected over guide 3 provided with a corresponding slot 3'. Sectional bar 9 emerges from extrusion tool 1, with its surface in sliding friction with the tool aperture wall, and the tool insert 6 defines part of that wall. If the temperatures in extrusion tool 1, which is heated in a conventional manner, and of the tool insert 6 are different, the surface of sectional bar 9 as it emerges from extrusion tool 1 is exposed to these different temperatures, so that the surface will show different degrees of brightness. In a thermal separation between the extrusion tool and the tool insert 6, for example by cooling the latter, the surface zone of sectional bar 9 coming into contact with the tool insert 6 will be extruded with a dull surface. The varnish coat 11 underneath will thus likewise be dull, which is highly desirable.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Method for producing an extruded plastic sectional bar, or the like profiled element, wherein the bar, or the like, has a first and a second longitudinally extending section measured around the bar and the first section has a surface that is duller than the surface of the second section, the method comprising:

extruding the bar, or the like through an extrusion tool having an extrusion outlet, and while extruding the bar, exposing the first and second sections of the bar to different temperatures at the extrusion outlet at the respective areas of the extrusion tool which the first and second sections of the bar pass.

2. The method of claim 1 further comprising the steps of varnishing a surface of a trim foil and positioning the varnished trim foil within the bar during extrusion below the surface of the first section with the varnished surface of the trim foil facing the surface of the first section.

3. Apparatus for producing an extruded plastic sectional bar, or the like profiled element, wherein the bar, or the like, has a first and a second longitudinally extending section measured around the bar and the first section has a surface that is duller than the surface of the second section, the apparatus comprising:

an extrusion tool shaped for extruding and shaping the sectional bar, or the like, and for defining the surface thereof, the tool having an outlet end region which is divided in the outlet end region into a first and a second zone which are placed for being contacted by first and second sections of the bar, respectively, as the bar is extruded;

means for causing the first zone to be at a first temperature while the second zone is at a second, different temperature.

4. The apparatus of claim 3, wherein the causing means at the first zone comprises a tool insert for the extrusion tool for supplying a different temperature to the outlet end region.

5. The apparatus of claim 4, wherein the outlet end region includes a recess thereat in which the tool insert is received.

6. The apparatus of claim 4, wherein the tool insert includes a separate attachment, and the tool insert and separate attachment are thermally conductive; and means for establishing the temperature of the attachment for establishing the temperature of the tool insert.

7. The method of claim 2 in which the trim foil is positioned from the surface of the first section so that the varnish is dulled during extrusion.

* * * * *